(12) United States Patent
Artamo et al.

(10) Patent No.: US 7,231,007 B2
(45) Date of Patent: Jun. 12, 2007

(54) MEASURING METHOD, AND RECEIVER

(75) Inventors: Atte Artamo, Espoo (FI); David Astély, Stockholm (SE)

(73) Assignee: Nokia Corporation, Espoo (FI)

( * ) Notice: Subject to any disclaimer, the term of this patent is extended or adjusted under 35 U.S.C. 154(b) by 744 days.

(21) Appl. No.: 10/450,610

(22) PCT Filed: Dec. 19, 2001

(86) PCT No.: PCT/FI01/01134

§ 371 (c)(1),
(2), (4) Date: Jun. 17, 2003

(87) PCT Pub. No.: WO02/052750

PCT Pub. Date: Jul. 4, 2002

(65) Prior Publication Data

US 2004/0042532 A1  Mar. 4, 2004

(30) Foreign Application Priority Data

Dec. 22, 2000  (FI) ................................. 20002844

(51) Int. Cl.
*H04B 7/10* (2006.01)
(52) U.S. Cl. .................................................... 375/347
(58) Field of Classification Search ................ 375/347, 375/148, 130, 267, 335, 147; 370/335, 342
See application file for complete search history.

(56) References Cited

U.S. PATENT DOCUMENTS 6,128,355 A  10/2000 Backman et al.
6,144,711 A  11/2000 Raleigh et al.
6,215,814 B1 *  4/2001 Ylitalo et al. ............... 375/148
6,529,545 B2 *  3/2003 Tiirola et al. ............... 375/148

FOREIGN PATENT DOCUMENTS

| EP | 1 150 441 A1 | 10/2001 |
|---|---|---|
| WO | WO 00/16494 | 3/2000 |
| WO | WO 00/36765 | 6/2000 |

OTHER PUBLICATIONS

"Signal Acquisition and Tracking with Adaptive Arrays in Wireless Systems", Jack H. Winters, IEEE, 1993, pp. 85-88.

* cited by examiner

*Primary Examiner*—Khai Tran
(74) *Attorney, Agent, or Firm*—Squire, Sanders & Dempsey L.L.P.

(57) ABSTRACT

The invention relates to a measuring method and a receiver. An array antenna is used for measuring the spatial colour of received interference. Using the spatial colour measurement result, an interference detector (217) controls a method to be used for combining the signals received by the different antenna elements (200–202). Monitoring devices (219) are used, in turn, for monitoring the spatial colour of the interference and for taking into account the result of the colour measurement for enhancing the operation of a radio system.

21 Claims, 2 Drawing Sheets

MEASURING METHOD, AND RECEIVER

FIELD OF THE INVENTION

The invention relates to a measuring method employing a spatial diversity antenna and to a receiver.

BACKGROUND OF THE INVENTION

Interference caused by other users or systems and noise sum into a signal on the radio path. Radio systems therefore employ different diversity methods to increase the coverage area and/or capacity of the system. One of them is spatial diversity, which is obtained using an array antenna comprising a plural number of antenna elements that are physically separate from each other. The received signals are combined in diversity receivers that employ maximal-ratio combining, for example.

Current receivers are based on statistical signal models the accuracy of which cannot be relied on in all situations. The impact of noise and interference can be reduced in the Maximal Ratio Combining (MRC) method, for example. However, this method supposes that the interference and noise in each antenna element are independent of other antenna elements, i.e. they are white. In actual cellular radio networks this is not always true; for example, the interference that high-power signals, a few at the most, cause upon reception may affect all the antenna elements, i.e. the interference in the antenna elements is coloured.

Interference Rejection Combining (IRC) is a method that does not contain assumptions about whether interference and noise correlate with antenna elements. A disadvantage of the IRC method is that it occupies more baseband processing capacity than the MRC method, because there are more parameters to be estimated although the sample group available is the same. When used extensively, baseband processing may reduce the ability of the base station to serve the subscriber terminals and, thereby, it may impair cell capacity. Due to errors that may take place in parameter estimation if the number of parameters to be estimated is large, the use of complex interference elimination methods may even degrade the capacity of the receiver.

SUMMARY OF THE INVENTION

It is therefore an object of the invention to provide an improved measuring method and an arrangement implementing the method to avoid the use of complex interference elimination methods when they are not needed. In addition, the aim is to enhance radio system design and maintenance. These objects are achieved by a measuring method for a receiver in a radio system, the receiver comprising an array antenna for signal reception and the array antenna comprising at least two antenna elements. The method comprises the steps of measuring with the array antenna the spatial colour of received interference; controlling a method to be used for combining the signals received by the different antenna elements on the basis of the measurement result of the spatial colour of the interference.

The invention further relates to a measuring method for a receiver in a radio system, the receiver comprising an array antenna for signal reception and the array antenna comprising at least two antenna elements. The method comprises the steps of measuring with the array antenna the spatial colour of received interference; monitoring the spatial colour of the interference and taking into account the result of the colour measurement for enhancing the operation of the radio system.

The invention further relates to a receiver comprising an array antenna for signal reception, the array antenna comprising at least two antenna elements. The receiver further comprises an interference detector for measuring the spatial colour of the interference received with the array antenna; and controlling means for controlling a method to be used for combining the signals received by the different antenna elements on the basis of the measurement result of the spatial colour of the interference.

The invention still further relates to a receiver comprising an array antenna for signal reception, the array antenna comprising at least two antenna elements. The receiver further comprises an interference detector for measuring the spatial colour of the interference received with the array antenna; and monitoring means for monitoring the spatial colour and for using the measurement result of the spatial colour of the interference for enhancing the operation of a radio system.

The preferred embodiments of the invention are disclosed in the dependent claims.

The invention is based on deciding on a signal model suitable for a received signal on the basis of a sample group taken from the signal. In a hard decision mode it is decided whether a spatially coloured or spatially white model of noise and interference will be created. In a soft decision mode the degree of spatial colour in the interference is determined.

The method and arrangement of the invention provide several advantages. With the statistical model of the received signal known, it is easier to estimate a covariance matrix for noise and interference. The statistical signal model allows assumptions to be made regarding the existence of strong interference sources.

BRIEF DESCRIPTION OF THE DRAWINGS

In the following, the invention will be described in greater detail with reference to the preferred embodiments and the accompanying drawings, in which.

DETAILED DESCRIPTION OF THE INVENTION

Figure 1:
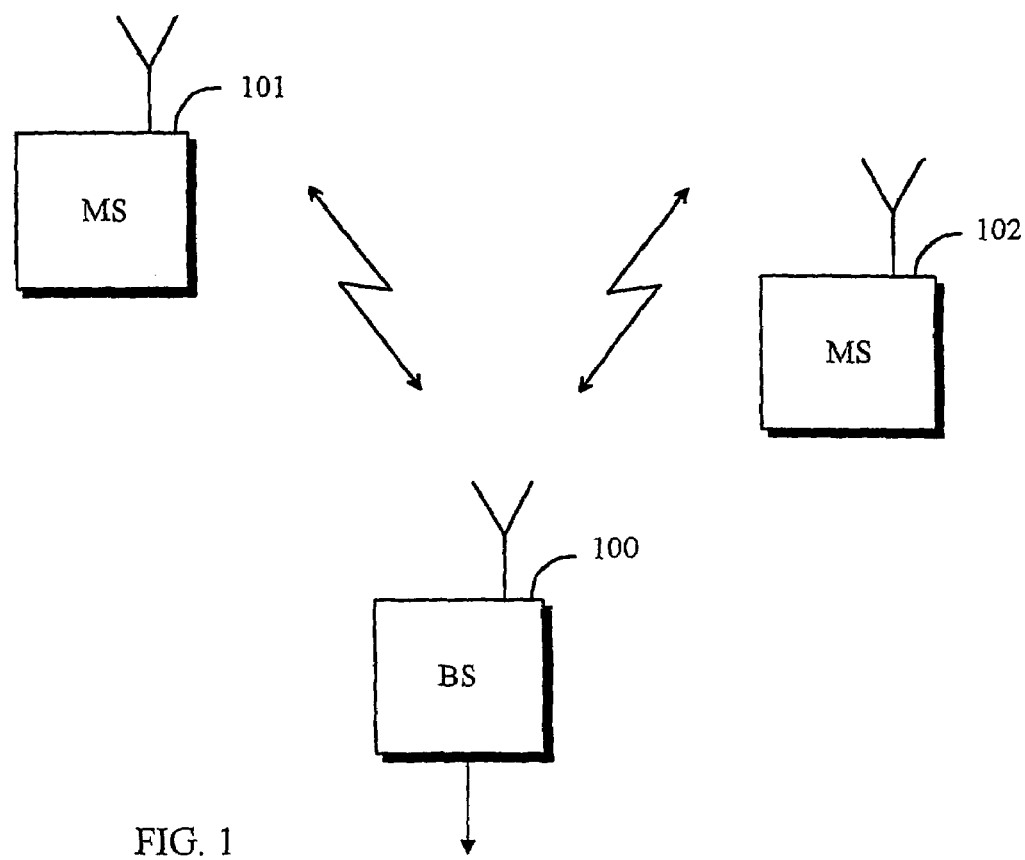
FIG. 1 shows a radio system.

The described solution may be applied in digital TDMA, FDMA and CDMA radio systems, although it is not restricted to them.

Let us first examine the theoretical basis of the disclosed solution. A received signal can be expressed as $$r(t) = h_{k,m} s_k(t - \tau_{m,k}) + u_{k,m}(t) \qquad (1)$$

where r(t) is a vector corresponding to the received signal and comprising L elements, L denoting the number of diversity antenna elements, M is the number of paths, m is a path index, s(t) is a transmitted symbol, $\tau_m$ denotes a propagation delay and $h_m$ denotes a complex channel response on the $m^{th}$ path, and vector $u(t) = (u_1(t), u_2(t), \ldots, u_L(t))^T$ represents disturbance that consists of interference and noise. Interference mainly consists of multiple access interference (MAI) and interpath interference (IPI), for example. Noise, in turn, may be thermal noise associated with the antenna structure, for example. Interference can be expressed with the following vector:

$$u_{0,0}(t) = \sum_{k=0}^{K-1} \sum_{m=1}^{M_k-1} h_{k,m} s_k(t - \tau_{k,m}) + \sum_{k=1}^{K-1} \sum_{m=0}^{M_k-1} h_{k,m} s_k(t - \tau_{k,m}) + n(t), \qquad (2)$$

where K is the number of users, $M_k$ the number of paths of $k^{th}$ user, $h_{k,m}$ is the channel estimate for the $m^{th}$ path of the $k^{th}$ user, n(t) is noise and $S_k$ is the symbol of the $k^{th}$ user, sent on the $m^{th}$ channel. User k=0 is thought to represent the desired signal, the signals of the rest of the users being thought of as interference. Noise n(t) represents uncorrelated interference appearing in the antennas. A spatial covariance matrix $R_{rr}$ of the received signal r(t) may be expressed as follows:

$$R_{rr}=E\langle rr^H\rangle \quad (3)$$

where $E\langle rr^H\rangle$ represents the expected value of product $rr^H$, and $r^H$ is a Hermitian vector of a complex matrix r representing the received signal. Correspondingly, covariance $R_{uu}$ of interference u can be expressed as follows:

$$R_{uu}^{k,m} = E\langle u_{k,m}u_{k,m}^H\rangle = R_{uu} = E\langle uu^H\rangle \quad (4)$$

where the meaning of u is the same as that of $u_{k,m}$. A signal of interest $r_{SOI}$ received in the CDMA radio system can be expressed as follows:

$$r_{soi}=h_{0,0}s(t-\tau_{0,0}) \quad (5)$$

However, before the decoding of the spreading code, the power of the desired signal is usually very low compared with the interference and for this reason the spatial covariance of the interference is approximately the same as that of the received signal.

$$R_{uu}\approx R_{rr}=E\langle rr^H\rangle \quad (6)$$

However, since spreading coding is not used in the TDMA and FDMA, this approximation cannot be made in them, but the covariance matrix $R_{uu}$ of formula (4) must be formed of samples from which the desired signal has been removed.

Let us now examine the estimation of the covariance matrix $R_{rr}$ in greater detail with particular reference to the CDMA system. The spatial covariance matrix $R_{uu}$ for interference ($R_{uu}\approx R_{rr}$ is valid in the CDMA system) indicates the degree of similarity of the interference in the different antenna elements, i.e. the correlation of interference between the different antenna elements. If interference signals received by the different antenna elements do not correlate with each other, the interference is spatially white and its covariance matrix $R_{uu}$ can be expressed as follows:

$$R_{uu}=\text{diag}(\sigma_1^2,\sigma_2^2,\ldots,\sigma_L^2), \quad (7)$$

where $\sigma_l^2$ denotes the intensity of the interference in an $l^{th}$ antenna element. If, in addition, the intensity of the interference received by each antenna is the same, the following expression is possible:

$$R_{uu}=\sigma^2 I, \quad (8)$$

where I is a unit matrix.

On the other hand, if the interference signal received by the different antenna elements is coloured, i.e. there is correlation between the interference signals of the different antenna elements, the covariance matrix can be written as follows:

$$R_{uu} = E\left(\begin{bmatrix} \sigma_1^2 & u_1 u_2^* & \ldots & u_1 u_L^* \\ u_2 u_1^* & \sigma_2^2 & \ldots & u_2 u_L^* \\ \ldots & \ldots & \ldots & \ldots \\ u_L u_1^* & u_L u_2^* & \ldots & \sigma_L^2 \end{bmatrix}\right). \quad (9)$$

where $\sigma_1^2$ denotes the product of interference $u_1 u_i^*$ in a first antenna element, $u_i^*$ representing a complex conjugate of $u_i$. In a broad sense, the received signal r(k) is modelled as a stationary process during the sampling and therefore its covariance matrix $R_{rr}$ represents a deterministic parameter. Table 1 shows a summary of different covariance matrixes $R_{rr}$, which in the CDMA system corresponds basically to $R_{uu}$. On the basis of a sample of a received signal it is possible to conclude which covariance matrix model of those shown in Table 1 is the most applicable for modelling the signal.

TABLE 1

Models for covariance matrix $R_{rr}$

| | | |
|---|---|---|
| 1. The received signal is spatially white, its power being the same in all the antenna elements | $R_{rr}(\Theta) = \sigma^2 I_L$ | $\Theta = \{\sigma^2\}$ one real parameter |
| 2. The received signal is spatially white, its power being different in different antenna elements | $R_{rr}(\Theta) = \text{diag}(\sigma_1^2, \sigma_2^2, \ldots, \sigma_L^2)$ | $\Theta = \{\sigma_1^2, \sigma_2^2, \ldots, \sigma_L^2\}$ L real parameters |
| 3. The received signal is spatially white | $R_{rr}(\Theta) = R = \begin{pmatrix} r_{11} & r_{12} & \cdots & r_{1L} \\ r_{12} & r_{22} & \cdots & r_{2L} \\ \vdots & & \ddots & \vdots \\ r_{1L} & & \cdots & r_{LL} \end{pmatrix}$ | $\Theta = \{r_{ij}, i = 1 \ldots L, j = i \ldots L\}$ $L^2$ real parameters |

The solution disclosed herein will concentrate on models 1 and 3. Under the impact of spatially coloured interference, the covariance matrix of the interference is non-diagonal. This means that the interference detected at reception correlates in the separate receiving antenna elements during the time the covariance matrix $R_{uu}$ is formed. Uneven distribution of interference in receiving directions may be due to a number of reasons, such as a high data transfer rate or power of a signal received from a subscriber terminal compared with other transmitters, a malfunction of a subscriber terminal, an illegal transmitter, a signal from a transmitter of another radio system (because of poor network planning), etc.

The received signal is supposed to follow normal distribution and the samples are temporally white, i.e. samples taken at different points of time are mutually independent. Consequently, the following probability density function (PDF) common to P samples of the received signal r[p], p=1 . . . P, is arrived at:

$$f(\{r[p], p = 1 \ldots P\}, \Theta) = \prod_{p=1}^{P} \left( \frac{1}{\pi^L |R_{rr}|} \exp(-r^H[p] R_{rr}^{-1}(\Theta) r[p]) \right) \quad (10)$$

From this, the following log-likelihood function is obtained:

$$-\ln f(\{r[p], p=1 \ldots P\}, \Theta) = PL\ln\pi + P\ln|R_{rr}(\Theta)| + P\text{trace}\{\hat{R}_{rr} R_{rr}^{-1}(\Theta)\} \quad (11)$$

where $\text{trace}\{\hat{R}_{rr} R_{rr}^{-1}(\Theta)\}$ represents the trace of matrix $\hat{R}_{rr} R_{rr}^{-1}(\Theta)$, i.e., the sum of diagonal elements, matrix $R_{rr}$ denotes an expected value obtained from the received signal, a covariance matrix $\hat{R}_{rr}$ estimated on the basis of the received samples being defined as follows:

$$\hat{R}_{rr} = \frac{1}{P} \sum_{p=1}^{P} r[p] r^H[p]. \quad (12)$$

where vector r[p] representing the signal is the $p^{th}$ sample of the received signal. In the disclosed solution, the number K of samples must be greater than the number L of antennas, i.e. K≧L. In this case the covariance matrix has an inverse matrix, which is necessary in order for a logarithmic, concentrated likelihood function to be formulated.

Let us then examine the deducing of an ML estimate for covariance matrix $R_{rr}$, assuming that the received signal is spatially white. Interference signals between the different antenna elements are in this case assumed to be uncorrelated, and the negative log-likelihood function is:

$$L(\sigma^2) = PL\ln\pi + PL\ln\sigma^2 + \frac{P}{\sigma^2} \text{trace } \{\hat{R}_{rr}\} \quad (13)$$

By setting the value of the log-likelihood function derivative to zero, in order to obtain a local minimum, i.e.

$$\frac{dL(\sigma^2)}{d\sigma^2} = 0 \quad (14)$$

the following ML (Maximum Likelihood) estimate is obtained for the interference signal variance $\sigma^2$:

$$\hat{\sigma}^2 = \frac{1}{L} \text{ trace } \{\hat{R}_{rr}\} \quad (15)$$

The concentrated cost function obtained is $$L(\hat{\sigma}^2) = PL\ln\pi + PL\ln\frac{\text{trace }\{\hat{R}_{rr}\}}{L} + PL \quad (16)$$

Logarithm ln used in the function is a natural logarithm, its base number being e (e≈2.71828182 . . . ).

Let us then examine the deducing of the ML estimate for covariance matrix $R_{rr}$, assuming that the received signal is spatially coloured. In this case the interference signals between the different antenna elements are assumed to be correlated. The negative log-likelihood function now takes the following form:

$$L(R) = PL\ln\pi + PL\ln|R| + P \text{ trace } \{\hat{R}_{rr} R^{-1}\} \quad (17)$$

By setting the value of the log-likelihood function derivative to zero, in order to obtain a local minimum, i.e.

$$\frac{dL(R)}{dR} = PR^{-1} - PR^{-1}\hat{R}_{rr}R^{-1} = 0 \quad (18)$$

the following ML estimate is obtained for the covariance matrix of the samples:

$$R = \hat{R}_{rr} \quad (19)$$

Hence, the concentrated cost function obtained is $$L(\hat{R}) = PL\ln\pi + P\ln|\hat{R}_{rr}| + PL \quad (20)$$

Table 2 provides a summary of the models for the MRC and IRC combining methods, ML estimates and the concentrated ML cost functions for different signal models.

TABLE 2

| | Models, ML estimate and ML cost functions | |
|---|---|---|
| Model | ML estimate | Concentrated ML cost function $-\ln f(\{r[p], p = 1 \ldots P\}, \hat{\Theta})$ |
| $R_{rr}(\Theta) = \sigma^2 I_L$ 1 real parameter | $R_{rr}(\hat{\Theta}) = \frac{\text{trace}\{\hat{R}_{rr}\}}{L} I_L$ | $PL\ln\pi + PL\ln\frac{\text{trace}\{\hat{R}_{rr}\}}{L} + PL$ |
| $R_{rr}(\Theta) = R$ $L^2$ real parameters | $R_{rr}(\hat{\Theta}) = \hat{R}_{rr}$ | $PL\ln\pi + P\ln|\hat{R}_{rr}| + PL$ |

The concentrated cost function is needed for deducing the method of detecting the spatial colour of interference.

The spatial colour of interference is detected using an interference detector, which can be used for controlling the receiver to select a combining method. Examples of the combining methods include MRC combining and IRC combining. These combining methods correspond to different ways of weighting the signals arriving from the different antenna branches, before they are combined. The interference detector can also be used for monitoring the spatial colour of interference and for using the monitoring results in connection with the maintenance or design of a radio system to provide enhanced radio system operation.

A basic principle is to select a combining method based on the most appropriate covariance matrix model in each case. The most appropriate covariance matrix model is selected using the MDL (Minimum Description Length) criterion. Covariance models, which comprise varying numbers of parameters, are compared with each other on an equal basis by applying the MDL criterion, the best covariance model being the one that minimizes the following expression:

$$MDL(M) = -2 \ln f(\{r[p], p=1 \ldots P\}, \hat{\Theta}) + M \ln P \quad (21)$$

where M is the number of parameters, either 1 or $L^2$, in parameter variable $\Theta$. An increase in the number of parameters results to an estimate corresponding increasingly better to reality and to a decrease in the negative log-likelihood function. The second term represents a penalty term that grows as the number of parameters increases.

Table 3 shows the MDL cost function for the two models (MRC and IRC).

TABLE 3

| | Number of parameters M | MDL cost functions<br>MDL<br>$-2\ln f(\{r[p], p=1 \ldots P\}, \hat{\Theta}) + M\ln p$ |
|---|---|---|
| MRC | 1 | $2PL\ln\pi + 2PL\ln\frac{\text{trace}\{\hat{R}_{rr}\}}{L} + 2PL + \ln P$ |
| IRC | $L^2$ | $2PL\ln\pi + 2P\ln|\hat{R}_{rr}| + 2PL + L^2\ln P$ |

In the hard decision mode, when either IRC or MRC is to be used, the following selection rule is obtained for the combining method:

$$2PL\ln\pi + 2P\ln|\hat{R}_{rr}| + 2PL + L^2\ln P \underset{MRC}{\overset{IRC}{\lessgtr}} 2PL\ln\pi + 2PL\ln\frac{\text{trace}\{\hat{R}_{rr}\}}{L} + 2PL + \ln P \quad (21)$$

$$2PL\ln\pi + 2P\ln|\hat{R}_{rr}| + 2PL + L^2\ln P \underset{MRC}{\overset{IRC}{\lessgtr}} 2PL\ln\pi + 2PL\ln\frac{\text{trace}\{\hat{R}_{rr}\}}{L} + 2PL + \ln P \quad (22)$$

In other words, when the MDL cost function corresponding to the IRC method produces a lower value than the MDL cost function corresponding to the MRC method, the IRC method is selected in the hard decision mode. Correspondingly, the MRC method is selected when the MDL cost function corresponding to the MRC method produces a lower value than the MDL cost function corresponding to the IRC method.

The selection can be simplified into $$\frac{|\hat{R}_{rr}|}{(\text{trace}\{\hat{R}_{rr}\})^L} \underset{MRC}{\overset{IRC}{\lessgtr}} \frac{1}{L^L}\left[P^{\left(\frac{1-L^2}{2P}\right)}\right] \quad (23)$$

The IRC method is thus selected when the MDL cost function $$\frac{|\hat{R}_{rr}|}{(\text{trace}\{\hat{R}_{rr}\})^L}$$

$$\frac{1}{L^L}\left[P^{\left(\frac{1-L^2}{2P}\right)}\right]$$

produces a lower value than the MDL cost function corresponding to the MRC method. Correspondingly, the MRC method is selected when the MDL cost function $$f_{MRC} = \frac{1}{L^L}\left[P^{\left(\frac{1-L^2}{2P}\right)}\right]$$

corresponding to the MRC method produces a value that is lower than (or at most equal to) the value provided by the MDL cost function $f_{IRC} =$ $$\frac{|\hat{R}_{rr}|}{(\text{trace}\{\hat{R}_{rr}\})^L}$$

corresponding to the IRC method. The computation can be simplified because the right-hand side term $$\frac{1}{L^L}\left[P\left(\frac{1-L^2}{2P}\right)\right]$$

can be computed in advance for the desired solution, the right-hand side term being only dependent on the number L of the antennae and the number P of the samples. In the soft decision mode, the amount of spatial colour is given, and the reliability of the decision can thus be illustrated for example by formulating a value I indicating the degree of the colour of the interference as follows:

$$I = \frac{(\text{trace}\{\hat{R}_{rr}\})^L P^{\frac{1-L^2}{2P}}}{|\hat{R}_{rr}|L^L} \quad (24)$$

The value I for the degree of the colour of the interference can be monitored and the value I for the degree of colour of the interference can be signalled to the radio network management system, from where the operator, for example, receives the information and can thus influence the maintenance and design of the radio network system. As already stated above, the changing of the combining method involves the changing of the covariance matrix model $R_{rr}$ when a weight vector is to be formed for weighting the signals of the different antenna elements before they are combined. The covariance matrix $R_{rr}$ estimates are shown in Table 2. When the MRC method is being used, the weight vector is thus formed as follows:

$$w_{k,m} = c \frac{L}{\text{trace}\{\hat{R}_{rr}\}} h_{k,m} \quad (25)$$

The term $$c \frac{L}{\text{trace}\{\hat{R}_{rr}\}}$$

preceding the channel estimate is a scalar coefficient the value of which may be assumed to be 1, or any other fixed value, and therefore it does not need to be calculated if the MRC method is used all the time. When the IRC method is used, the weight vector $w_{k,m}$ is formed as follows:

$$w_{k,m} = c\hat{R}_{rr}^{-1} h_{k,m} \quad (26)$$

where c is a scalar coefficient that may obtain the value 1, $\hat{R}_{rr}$ is a covariance matrix, $h_{k,m}$ is a channel estimate, k is a user index and m is a path index. A separate weight vector $w_{k,m}$ is formed for each delay to be examined. The length of the weight vector is L elements, L being the number of the antenna elements.

The weight coefficients can be formed by using an estimate of covariance matrix estimate $\hat{R}_{rr}$ and a channel estimate by applying for example the LMS (Least Mean Square) and DMI (Direct Matrix Inversion) algorithms, which are described in greater detail in Winters, J., H., Signal Acquisition and Tracking with Adaptive Arrays in Wireless Systems, pp. 85–88, IEEE, 1993, to be included herein by reference. An aspect that slightly simplifies the solution is that the covariance matrix $\hat{R}_{rr}$ is the same for all cell users and delays. The combining method is changed and scaled preferably frame-by-frame. A 3GPP (Third Generation Partnership Project) detector, together with a demodulator, carries out the soft decision of the received symbol, which may be a bit or a bit combination. The output variables of the soft decision detector are called soft symbols or bits. The soft symbols are decoded in a channel decoder. According to the 3GPP standard, convolution coding or turbo channel coding is used. When MRC combining is changed to IRC combining, the weighting of the soft bits should remain unchanged, otherwise the decoder cannot function properly.

The IRC method occupies more baseband processing capacity than the MRC method. When used extensively, baseband processing may reduce the ability of the base station to serve subscriber terminals and thereby impair cell capacity. The use of the IRC method may even impair the performance of the receiver due to errors in parameter estimation, because the number of parameters to be estimated is large and the more parameters are estimated, the higher is error probability. In the MRC method there are fewer parameters to be estimated than in the IRC method. Consequently, it is reasonable to use the IRC method only when there is a real need for it.

FIG. 1 shows a schematic view of a radio system structure. The radio system comprises at least one base station 100 communicating with subscriber terminals 101–102 with radio frequency signals. The subscriber terminals 101–102 are preferably mobile phones. The base station 100 usually communicates with a base station controller (not shown in FIG. 1), which controls the operation of the base stations. The disclosed solution can be applied at least in the TDMA, FDMA and CDMA radio systems. The receiver is preferably a radio system base station.

Figure 2B:
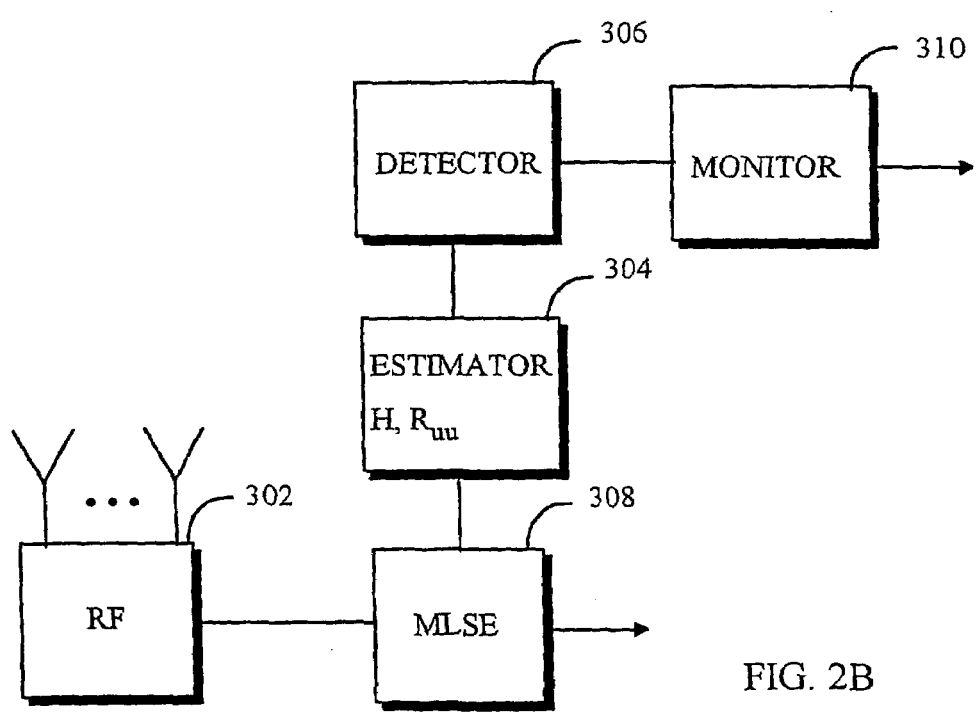
FIG. 2B shows a receiver suitable for TDMA and FDMA radio systems.
Figure 2A:
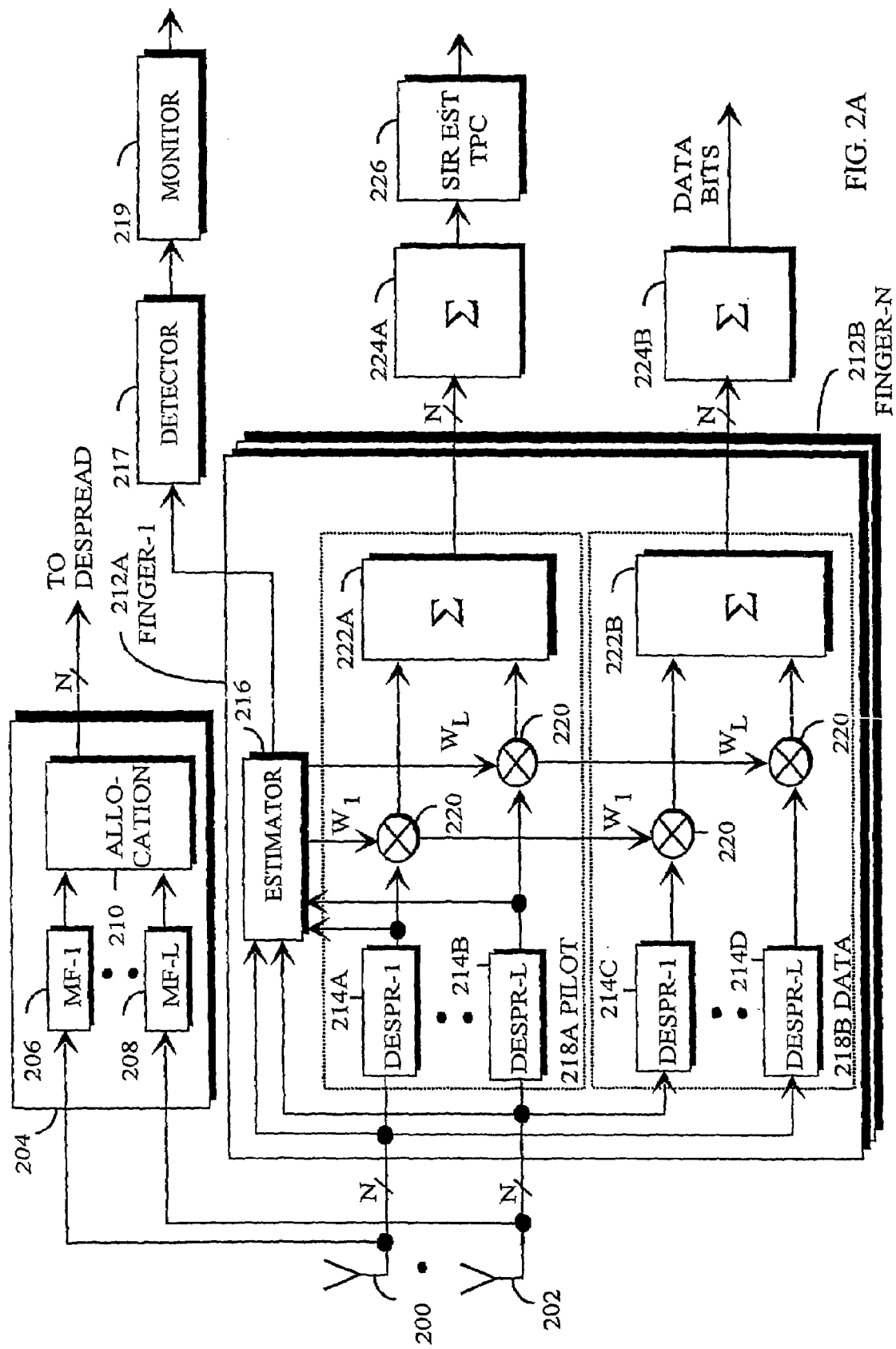
FIG. 2A shows a CDMA receiver.

With reference to FIG. 2A, let us then examine a receiver used for CDMA reception. A multipath-propagated signal is received over antenna elements 200–202. There are L antenna elements, and although FIG. 2A only shows two antenna elements, there may be more of them. Usually the number of antenna elements varies between two and eight. A signal received from each antenna element 200–202 is converted to baseband in radio frequency parts (not shown in FIG. 2A) and supplied to a delay estimator 204, which comprises a matched filter 206–208 for each antenna element. At the delay estimator 204, delays of the multipath-propagated components of the received signal are searched for. On the basis of calculated correlations, an allocator 210 included in the delay estimator selects the delays to be used by depreading means 214A–214D of Rake branches 212A–212B for decoding the spreading code. In this example, there are N allocated Rake branches 212A–212B. Each Rake branch 212A–212B processes an equal number of multipath-propagated signal components at a predetermined code delay.

Each Rake branch 212A–212B comprises an estimator 216 to which a baseband signal is supplied from each antenna element 200–202. The estimator 216 forms a channel estimate h and covariance matrix $R_{uu} \approx R_{rr}$ for the signal received by each antenna element 200–202. The spatial colour of the interference is measured at an interference detector 217, which controls the estimator 216 in accordance with the disclosed method to form complex weight coefficients $w_1$–$w_L$ for the signals received by the different antenna elements 200–202. The estimator 216 functions as a controlling means, the weight coefficients $w_1$–$w_L$ formed by it being used for multiplying signals arriving from the different antenna elements 200–202 in multipliers 220. From the interference detector 217, information about the spatial colour of the interference can be supplied further to monitoring means 219 in the radio system management system. In the areas encircled by a dotted line, the processing 218A of a pilot signal contained in the signal and the processing 218B of the data part contained in the signal take place. An antenna branch summer 222A located at the end of the Rake branch 212A–212B is used for combining the weighted pilot signal components to form a single pilot signal. Correspondingly, data signal components are combined in an antenna branch summer 222B to form a single data signal. The Rake receiver further comprises a Rake branch summer 224A, which is used for combining the pilot signals of Rake branches 212A–121B operating at different delays to form a summed pilot signal. The summed pilot signal can be further supplied to a signal-to-interference ratio estimator 226, in which the signal-to-interference ratio of the channel in question is estimated. The obtained signal-to-interference ratio of the channel can be used for controlling closed loop power supply. The Rake branch summer 224B, in turn, is used for combining the data signals of the Rake branches 212A–212B operating at different delays to form a summed data signal.

FIG. 2B shows a block diagram of a receiver suitable for a TDMA or FDMA radio system. The antenna array comprises L antenna elements 300. From the antenna elements 300, the signals propagate to radio frequency parts 302, which convert the radio frequency signals into baseband. The baseband signals further propagate to an estimator 304 in which covariance matrix $R_{uu}$ and channel estimates are formed for the signals received from each antenna element. The covariance matrix $R_{uu}$ is supplied to an interference detector 306, which determines the signal model to be applied to the received signal. The channel estimate H and the covariance matrix $R_{uu}$ based on the signal model are supplied to an MLSE estimator 308, which demodulates the signal. The MLSE estimator 308 also functions as a control means weighting and combining the signals arriving from the antenna elements 300 in a manner known per se. The operation of the MLSE estimator is usually based on the Viterbi algorithm, which takes into account multipath propagation. The information about the spatial colour of the interference can be supplied further from the interference detector 308 to monitoring means 310.

If the source of spatially coloured interference is an illegal or malfunctioning transmitter, the disclosed Solution allows the interference to be reduced or removed. This can be achieved by means of different combining methods, by locating the source of the interference, by switching off the interfering transmitter, or by reducing the intensity of the interference of the transmitter.

The disclosed receiver is applicable both in a CDMA base station and subscriber terminal. The computation associated with the covariance matrix $\hat{R}_{rr}$ can be carried out using an ASIC (Application Specific Integrated Circuit) to ensure that the computation does not load the DSP (Digital Signal Processing) resources, although the computational operations associated with the disclosed solution can be carried out using DSP software. For a precise covariance estimate to be produced, the sampling should preferably be carried out at the chip frequency of the spreading code. It is also possible to form the covariance matrix from samples taken at a lower frequency, the received sample sequence being decimated by N and only each $N^{th}$ sample being used.

Although the invention is disclosed above with reference to an example based on the accompanying drawings, it is apparent that the invention is not restricted thereto but can be varied in many ways within the inventive idea disclosed in the accompanying claims.

The invention claimed is:

1. A measuring method for a receiver in a radio system, the method comprising:

measuring with the array antenna the spatial colour of received interference;

controlling a method to be used for combining the signals received by the different antenna elements on the basis of the measurement result of a spatial colour of the interference; and measuring the spatial colour of the interference by using a spatial covariance matrix $R_{uu}$ of the interference such that in a code division multiple access (CDMA) radio system the interference covariance matrix $R_{uu}$ is estimated by a signal covariance matrix $R_{rr}$, i.e. $R_{uu} \approx R_{rr} = E\langle rr^H \rangle$, wherein the receiver includes an array antenna for signal reception and the array antenna includes at least two antenna elements.

2. A method according to claim 1, the method further comprising measuring the spatial colour of the interference by using a minimum description length (MDL) criterion.

3. A method according to claim 1, the method further comprising using at least two methods for combining received signals and selecting the combining method on the basis of the spatial colour of the interference.

4. A method according to claim 1, method further comprising measuring the spatial colour of the interference by determining the degree of the spatial colour of the interference.

5. A method according to claim 1, method further comprising using spatial colour of the interference for detecting the presence of interference and for reducing the impact of the interference.

6. A method according to claim 1, further comprising scaling a soft symbol decisions according to the combining method, when soft symbol decisions are formed regarding a received signal.

7. A measuring method for a receiver in a radio system, the method comprising:

measuring with an array antenna the spatial colour of received interference;

controlling a method to be used for combining signals received by the different antenna elements based on the measurement result of a spatial colour of the interference; and determining a minimum description length (MDL) cost function for a maximum ratio combining (MRC) combining method as follows $$f_{MRC} = 2PL\ln\pi + 2PL\ln\frac{\text{trace}\{\hat{R}_{rr}\}}{L} + 2PL + \ln P;$$

an MDL cost function is determined for the IRC combining method as follows $$f_{IRC} = 2PL\ln\pi + 2P\ln|\hat{R}_{rr}| + 2PL + L^2 \ln P;$$

where P is the number of samples, L is the number of antenna elements, $\hat{R}_{rr}$ is a covariance matrix; and, to control the combining method, the MRC combining method is selected, if $f_{MRC} \leq f_{IRC}$; and the IRC combining method is selected, if $f_{IRC} < f_{MRC}$ wherein the receiver includes an array antenna for signal reception and the array antenna includes at least two antenna elements.

8. A measuring method for a receiver in a radio system, the method comprising:
measuring with an array antenna spatial colour of received interference;
controlling a method to be used for combining the signals received by different antenna elements based on the measurement result of a spatial colour of the interference,
a maximum ratio combining (MRC) combining method, the weight vector $w_{k,m}$ of the MRC combining method being $$w_{k,m} = c \frac{L}{\text{trace}\{\hat{R}_{rr}\}} h_{k,m}; \text{ and}$$

an interference rejection combining (IRC) combining, the weight vector $w_{k,m}$ of the IRC combining method being $w_{k,m} = c\hat{R}_{rr}^{-1}h_{k,m}$, where c is a scalar coefficient, L is the number of antenna elements, $\hat{R}_{rr}$ is a covariance matrix, $h_{k,m}$ is a channel estimate, k is a user index and m is a path index,
wherein the receiver includes an array antenna for signal reception and the array antenna includes at least two antenna elements.

9. A receiver comprising an array antenna for signal reception, the receiver comprising:
an array antenna configured to receive a signal, the antenna array comprising at least two antenna elements:
an interference detector configured to detect spatial colour of interference received with the array antenna; and
a controlling unit configured to control a method to be used to combine signals received by the different antenna elements based on the measurement result of the spatial colour of the interference
wherein the interference detector is configured to measure the spatial colour of the interference by using a covariance matrix $R_{uu}$ of the interference such that in a code division multiple access (CDMA) radio system the interference detector is configured to estimate the interference covariance matrix $R_{uu}$ by a signal covariance matrix $R_{rr}$, i.e. $R_{uu} \approx R_{rr} = E(rr^H)$.

10. A receiver according to claim 9, wherein the interference detector is configured to measure the spatial colour of the interference by using a covariance matrix $R_{uu}$ of the interference and a minimum description length (MDL) criterion.

11. A receiver according to claim 9, wherein the receiver is configured to use at least two methods for combining received signals and the controlling unit is configured to select the combining method on the basis of the spatial colour of the interference.

12. A receiver according to claim 9, wherein, when the receiver is configured to form soft symbol decisions regarding a received signal, the controlling unit is configured to control the scaling of the soft symbol decisions according to the combining method.

13. A receiver comprising an array antenna for signal reception, the receiver comprising:
an array antenna configured to receive a signal, the antenna array comprising at least two antenna elements:

an interference detector configured to detect the spatial colour of interference received with the array antenna; and
controlling unit configured to control a method to be used to combine signals received by the different antenna elements based on the measurement result of the spatial colour of the interference,
wherein a minimum description length (MDL) cost function is determined for a maximum ratio combining (MRC) combining method as follows $$f_{MRC} = 2PL\ln\pi + 2PL\ln\frac{\text{trace}\{\hat{R}_{rr}\}}{L} + 2PL + \ln P;$$

an MDL cost function is determined for the IRC combining method as follows $$f_{IRC} = 2PL\ln\pi + 2P\ln|\hat{R}_{rr}| + 2PL + L^2\ln P;$$

where P is the number of samples, L is the number of antenna elements, $\hat{R}_{rr}$ is a covariance matrix; and,
to control the combining method,
the MRC combining method is selected, if $f_{MRC} \leq f_{IRC}$; and
the IRC combining method is selected, if $f_{IRC} \leq f_{MRC}$.

14. A receiver comprising an array antenna for signal reception, the receiver comprising:
an array antenna configured to receive a signal, the antenna array comprising at least two antenna elements:
an interference detector configured to detect the spatial colour of interference received with the array antenna; and
controlling unit configured to control a method to be used to combine signals received by the different antenna elements based the measurement result of the spatial colour of the interference;
wherein, when the receiver is configured to use the maximum ratio combining (MRC) combining method, the controlling unit is configured to form a weight vector $w_{k,m}$ weighting the signal coming from the different antenna elements as follows:

$$w_{k,m} = c \frac{L}{\text{trace}\{\hat{R}_{rr}\}} h_{k,m}; \text{ or,}$$

or,
when interference rejection combining (IRC) combining is used, the controlling unit is arranged to form the weight vector $w_{k,m}$ weighting the signal coming from the different antenna elements as follows: $w_{k,m}$ is $w_{k,m} = c\hat{R}_{rr}^{-1}h_{k,m}$, where c is a scalar coefficient, L is the number of antenna elements, $\hat{R}_{rr}$ is a covariance matrix, $h_{k,m}$ is a channel estimate, k is a user index and m is a path index.

15. A receiver, comprising:
an array antenna configured to receive a signal, the array antenna comprising at least two antenna elements
an interference detector configured to measure the spatial colour of interference received with the array antenna; and
monitoring unit configured to monitor the spatial colour and configured to use the measurement result of the spatial colour of the interference to enhance the operation of a radio system, wherein the interference detector is configured to measure the spatial colour of the interference by using a covariance matrix $R_{uu}$ of the interference such that in a code division multiple access (CDMA) radio system the interference detector is configured to estimate the interference covariance matrix $R_{uu}$ by means of a signal covariance matrix $R_{rr}$, i.e. $R_{uu} \approx R_{rr} = E\langle rr^H \rangle$, wherein the receiver includes an array antenna for signal reception and the array antenna includes at least two antenna elements.

16. A receiver according to claims 15, wherein to reduce interference, the monitoring unit assists in the detection of interference.

17. A receiver according to claim 15, wherein the interference detector is configured to measure the spatial colour of the interference by using a covariance matrix $R_{uu}$ of the interference and a minimum description length (MDL) criterion.

18. A measuring method for a receiver in a radio system, the method comprising:
  measuring with an array antenna a spatial colour of received interference;
  monitoring the spatial colour of the interference and taking into account the result of the colour measurement for enhancing the operation of the radio system, measuring the spatial colour of the interference by using a spatial covariance matrix $R_{uu}$ of the interference such that in a code division multiple access (CDMA) radio system the interference covariance matrix $R_{uu}$ is estimated by a signal covariance matrix $R_{rr}$, i.e. $R_{uu} \approx R_{rr} = E\langle rr^H \rangle$, wherein the receiver includes an array antenna for signal reception and the array antenna includes at least two antenna elements.

19. A method according to claim 18, the method further comprising measuring the spatial colour of the interference by using a covariance matrix $R_{uu}$ of the interference and a minimum description length (MDL) criterion.

20. A method according to claim 18, method further comprising measuring the spatial colour of the interference by determining the degree of the spatial colour of the interference.

21. A method according to claim 18, method further comprising using spatial colour of the interference to detect the presence of interference and to reduce the impact of the interference.

* * * * *